March 17, 1964  W. ZIMMERMAN  3,125,348
COMBINATION TANK BODY CONSTRUCTION
Filed June 22, 1961  2 Sheets-Sheet 1

Werner Zimmerman
INVENTOR.

BY *Clarence A. O'Brien*
*and Harvey B. Jacobson*
Attorneys

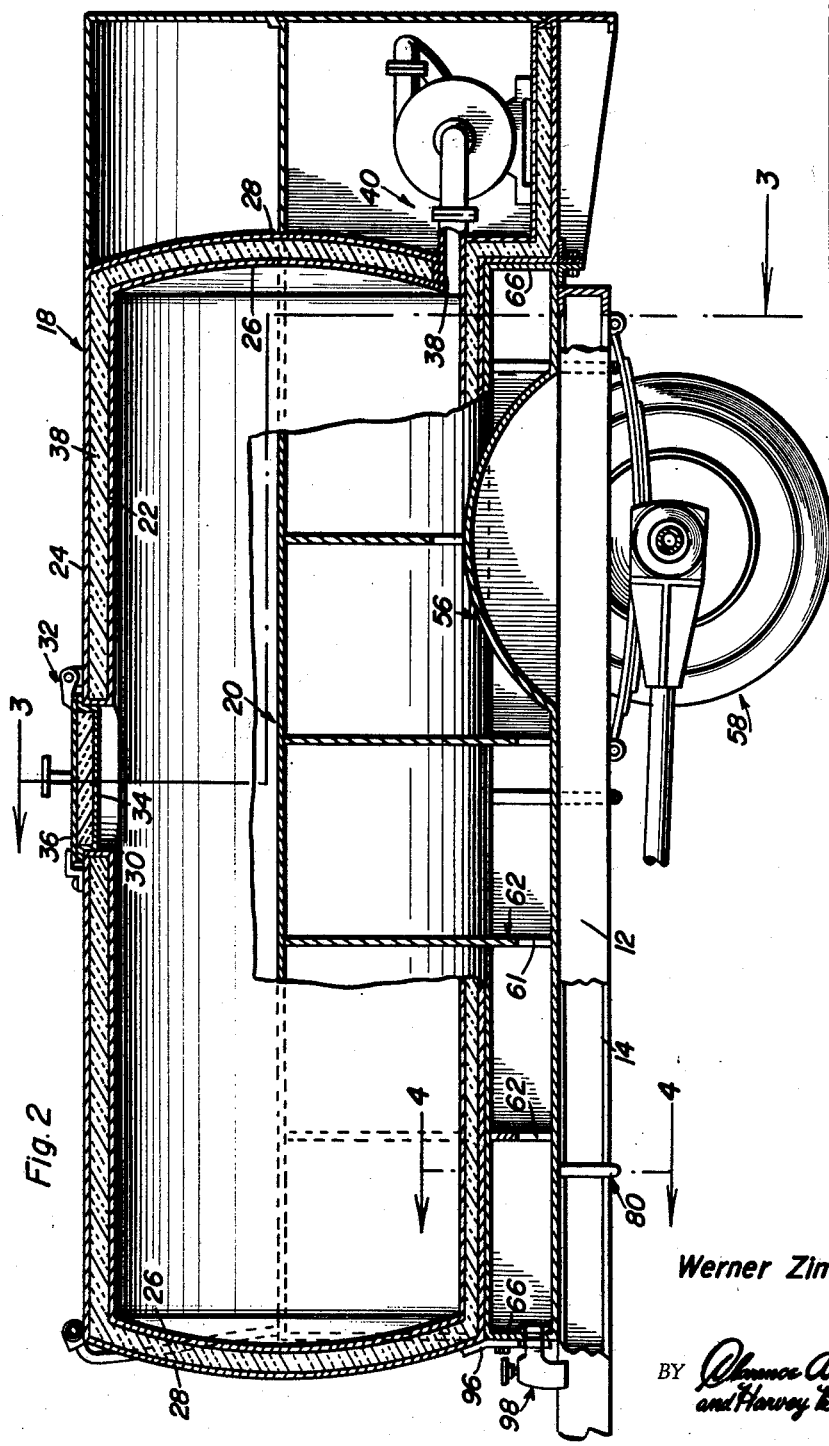

United States Patent Office 3,125,348
Patented Mar. 17, 1964

3,125,348
COMBINATION TANK BODY CONSTRUCTION
Werner Zimmerman, 903 12th St., Monroe, Wis.
Filed June 22, 1961, Ser. No. 118,939
7 Claims. (Cl. 280—5)

This invention relates to a novel and useful combination tank body construction and more particularly to a tank body construction specifically adapted for use with truck vehicles and to transport both bulk milk and whey.

In the past, combination tank body constructions utilised to carry both bulk milk and whey included separate tank sections which were disposed in longitudinal alignment on a truck vehicle. When a tanker truck having longitudinally aligned separate tank sections leaves the milk plant with whey completely filling the forwardmost tank on the truck, the truck is unevenly loaded and a major portion of the load is placed on the front axle of the truck and makes the latter extremely hard to steer. In addition, if the whey tank section is of any great capacity, the truck is top heavy. As the combination tanker vehicle makes stops to pick up milk, the rearmost milk tank is gradually filled and the whey tank disposed on the front of the truck is gradually emptied. Accordingly, by the time the milk tank section has been completely filled, the whey tank section has been emptied and the tanker truck is again unevenly loaded with the major portion of the load being disposed on the rear end of the truck. Accordingly, it may be observed that the driver of a tank truck must be constantly compensating for varying load distribution and may always be alert and aware as to whether or not the tank truck is heavily loaded in the front or heavily loaded in the rear. With the rear end of the truck heavily loaded the front end of the truck is comparatively light and is accordingly not as responsive to steering movements by the driver of the truck. In addition, a truck which is heavily loaded on the rear is difficult to handle on wet slippery roads.

The main object of this invention is to provide a combination tank body construction which will enable bulk milk and whey to be carried by a vehicle in varying proportions while still maintaining the vehicle proportionately loaded fore-and-aft. In this manner, the driver of the truck is constantly aware of the proportional fore-and-aft loading of the truck and has only to compensate for the combined load being carried by the truck.

A further object of this invention, in accordance with the preceding object, is to provide a combination tank body construction utilizing a generally elongated and horizontally disposed milk tank construction and a cradling generally elongated and horizontally disposed whey tank section immediately beneath the milk tank section.

Still another object of this invention is to provide the whey tank construction with a plurality of upstanding baffles extending between the top and bottom walls of the whey tank and to form the top wall of the whey tank to conform to the curvature of the lower portions of the side walls of the milk tank disposed immediately thereabove so that the milk tank may be cradled by the upper wall of the whey tank.

Still another object of this invention is to provide transversely extending baffle plates in the whey tank which extend entirely across the whey tank section between the opposite side walls thereof in order that the baffle plates may also be used to brace the opposite side walls of the whey tank.

Yet another object of this invention is to provide the transversely extending baffle walls in the whey tank with downwardly opening notches in their lower marginal edge portions whereby longitudinally spaced portions of the whey tank defined between adjacent baffles may be communicated with each other in order that the whey may be withdrawn from the whey tank from one end of the latter.

A still further object of this invention is to provide the whey tank with a plurality of longitudinally extending baffle plates which extend between the bottom wall of the whey tank and the transversely curved upper wall thereof.

A further object of this invention is to construct the bottom wall of the whey tank in a manner whereby it will be adapted to be disposed in surface-to-surface contacting relation with the upper surfaces of the longitudinal frame members of the truck vehicle to which the combination tank body construction is secured whereby the transversely extending baffle plates of the whey tank will be in direct contact with the longitudinal frame members of the truck vehicle in order that the undersurfaces of the curved side walls of the milk tank may be supported directly from the frame of the truck vehicle to which the tank body construction is secured.

A final object to be specifically enumerated herein is to provide a combination tank body construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal vertical sectional view of the combination tank body construction taken substantially upon a plane passing through the center of the tank body construction;

Figure 1:
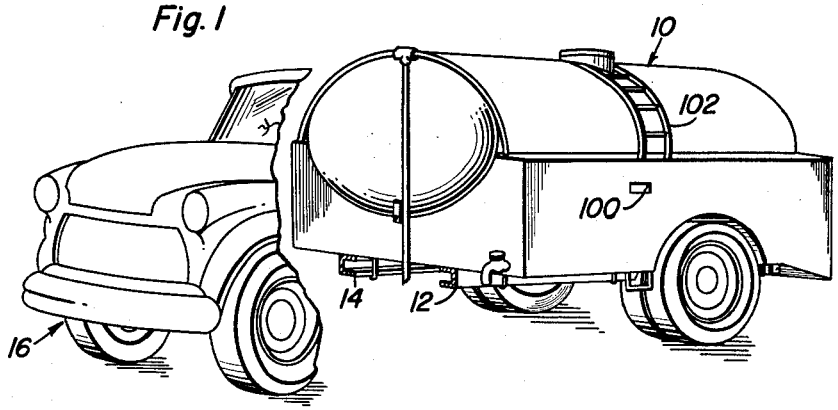
FIGURE 1 is a perspective view of the combination tank body construction of the instant invention shown mounted upon a conventional type of truck vehicle, portions of the latter being broken away and shown in section.
Figure 3:
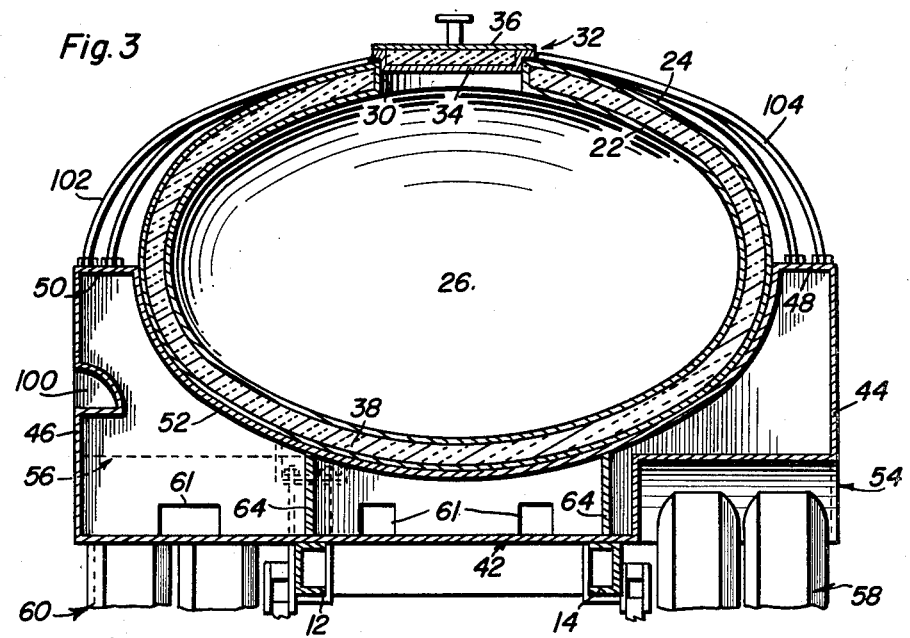
FIGURE 3 is a vertical transverse sectional view taken substantially upon the plane indicated by the section line 3—3 of FIGURE 2.
Figure 4:
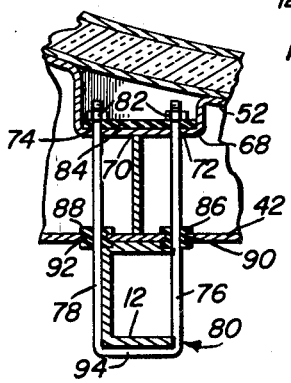
FIGURE 4 is a fragmentary enlarged vertical sectional view taken substantially upon the plane indicated by the section line 4—4 of FIGURE 2.

Referring now more specifically to the drawings the numeral 10 generally designates the combination tank body construction of the instant invention which is illustrated in FIGURE 1 of the drawings secured to the longitudinal frame members 12 and 14 of a conventional truck vehicle generally referred to by the reference numeral 16.

The combination tank body construction 10 includes a milk tank generally referred to by the reference numeral 18 and a whey tank generally referred to by the reference numeral 20. It will be noted that the milk tank includes generally cylindrical inner and outer side walls 22 and 24 respectively and inner and outer opposite end walls 26 and 28 respectively. The opposite end walls 26 are interconnected by means of the side walls 22 and the opposite end walls 28 are interconnected by means of the side walls 24. An inlet opening 30 is formed in the top of the milk tank 18 and a hinged closure cover generally referred to by the reference numeral 32 and including inner and outer walls 34 and 36 is provided for closing the inlet opening 30. Insulating material 38 is disposed between the inner and outer side walls 22 and 24, the inner and outer end walls 26 and 28 and the inner and outer walls 34 and 36 of the closure cover 32.

An outlet opening 38 is formed in the rear end of the milk tank 18 and has a pump assembly generally referred to by the reference numeral 40 communicated therewith for emptying the milk tank 18.

It will be noted that the whey tank 20 includes a bottom wall generally referred to by the reference numeral 42 and opposite side walls 44 and 46. The opposite side walls 44 and 46 are interconnected at their upper edges by means of horizontally disposed opposite side top wall sections 48 and 50 and a transversely concaved center or partial top wall section 52 with which the lower surfaces of the outer side walls 24 of the milk tank 18 are disposed in surface-to-surface contacting relation.

The whey tank 20 includes downwardly opening wheel wells 54 and 56 for receiving the upper portions of the dual wheel assemblies 58 and 60 of the vehicle 16 and it will be noted that the bottom wall 42 is disposed in surface-to-surface contacting relation with the upper surfaces of the longitudinal frame members 12 and 14 of the vehicle 16. In addition, the whey tank construction 20 is provided with a plurality of transversely extending and longitudinally spaced baffle plates generally referred to by the reference numerals 62 and each of the baffle plates 62 extends between the opposite side walls 44 and 46 and the bottom wall 42 and the upper wall sections 48, 50 and 52. In addition, a plurality of longitudinally extending baffle plates 64 are provided which extend between the bottom wall 42 and the partial upper or top wall section 52. In this manner, it will be noted that inasmuch as the lower surfaces of the milk tank side walls 24 are disposed in surface-to-surface contacting relation with the center transversely curved portion 52 of the upper wall of the milk tank 20 that the baffle plates 62 and 64 directly support the outer side walls 24 of the milk tank 18 from the frame members 12 and 14 of the vehicle 16. The longitudinal baffles 64 are in vertical alignment with the frame members 12 and 14 and the transverse baffles 62 extend between the frame members 12 and 14 within the whey tank 20.

In addition, it will be noted that the whey tank 20 includes opposite end walls 66 which are disposed in substantial vertical alignment with the end walls 26 and 28 of the milk tank 18 whereupon the latter are also substantially directly supported from the frame members 12 and 14 of the vehicle 16.

It will be noted that the upper wall section 52 is deformed to form a mounting bracket 68 and that the longitudinal baffle plates 64 are notched as at 70 to receive the bracket means 68. The bracket means 68 is suitably apertured as at 72 and 74 and the legs 76 and 78 of a U-bolt generally referred to by the reference numeral 80 are secured through the apertures 70 and 74 respectively by means of fasteners 82. A sealing member 84 is provided to insure that whey will not leak through the apertures 72 and 74 and the legs 76 and 78 pass through grommets 86 and 88 respectively disposed in apertures 90 and 92 formed in the bottom wall 42 of the whey tank 20. The bight portion 94 of the U-bolt 80 passes beneath the corresponding frame member of the vehicle 16 and in this manner the whey tank 20 is fixedly secured to the frame members 12 and 14 of the vehicle 16.

The above-referred to method of securing the whey tank 20 to the vehicle 16 is only one of many methods which may be employed and is not necessarily the preferred method.

The milk tank 18 may be secured to the whey tank 20 against longitudinal shifting relative to the latter by means of any suitable bracket or clamp means such as that indicated as at 96 in FIGURE 2. It will be noted that the whey tank 20 is provided with an outlet assembly 98 at the forward end thereof and the whey tank 20 may be emptied by means of gravity.

If it is desired, the whey tank 20 may have suitable outwardly opening notches 100 formed therein for forming footholds whereby a driver of the vehicle 16 may readily ascend to the ladder sections 102 and 104 which extend over the upper surfaces of the side walls 24 of the milk tank 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. In combination with a vehicle having a plurality of spaced longitudinally extending frame members, a combination tank body construction mounted on the frame members for transporting bulk milk and whey while maintaining proportional fore-and-aft as well as transverse weight distribution of the tank construction on the vehicle frame members regardless of the amount each tank section is filled, said tank construction comprising a generally elongated horizontally disposed and tubular milk tank having arcuate side walls and closed at opposite ends by means of end walls, a generally elongated, horizontally disposed and tubular whey tank having at least a partial transversely concaved upper wall conforming to and cradling the lower portions of the side walls of said milk tank, said whey tank also including opposite side walls interconnected at their upper ends by means of said top wall, opposite end walls disposed at opposite ends of said whey tank and a bottom wall extending between the lower ends of said whey tank side and end walls, said milk tank including inner and outer side and end walls disposed in spatial relationship, insulating material disposed between said inner and outer walls of the milk tank, said whey tank including upstanding baffle plates extending between said bottom wall thereof and said transversely curved upper wall for preventing shifting of the whey in said whey tank and affording support for said upper wall upon which the lower portion of the sides of said milk tank are disposed, some of said baffle plates extending transversely of said whey tank between opposite side walls thereof for substantially supporting the entire width of the adjacent portion of said upper wall, others of said plates extending longitudinally of said tank, and means for securing said longitudinally extending plates in vertical alignment with and to said frame members whereby the load of said tank body is directly supported on the frame of the vehicle, said longitudinal baffle plates being notched in the upper edge thereof at longitudinally spaced points along the length thereof, portions of the upper wall of said whey tank being deformed to form a plurality of mounting brackets received within said notches in the longitudinal baffle plates, said securing means including means for tying said mounting brackets to the frame members of the vehicle.

2. The combination of claim 1 wherein said tying means include U-bolts.

3. The combination of claim 1 wherein seal means are provided at the jointure of said tying means and mounting brackets.

4. The combination of claim 1 wherein said transversely extending baffle plates including downwardly opening notches formed in the lower edges thereof.

5. The combination of claim 4 wherein said notches are formed between adjacent longitudinal baffle plates and between opposite side longitudinal baffle plates and the said walls of said whey tank.

6. The combination of claim 5 including whey outlet means formed in one end wall of said whey tank and milk outlet means formed in one end wall of said milk tank.

7. The combination of claim 1 wherein said end walls of said whey tank are in substantial vertical alignment with the end walls of said milk tank and themselves comprise support plates for the opposite ends of said milk tank as do some of said baffle plates.

References Cited in the file of this patent

UNITED STATES PATENTS

| | | |
|---|---|---|
| 1,400,345 | Brile | Dec. 13, 1921 |
| 1,886,197 | Kramer | Nov. 1, 1932 |
| 2,037,024 | Holby | Apr. 14, 1936 |
| 2,229,793 | Bradley | Jan. 28, 1941 |
| 2,253,676 | Baade | Aug. 26, 1941 |
| 2,340,628 | Theriault | Feb. 1, 1944 |
| 2,474,094 | Colquitt | June 21, 1949 |
| 3,054,525 | Silvis | Sept. 18, 1962 |